June 4, 1940. J. P. JOHNSON 2,202,913
GEAR PUMP
Filed March 18, 1938 2 Sheets-Sheet 1

INVENTOR.
JAMES P. JOHNSON
BY
ATTORNEY.

June 4, 1940. J. P. JOHNSON 2,202,913
GEAR PUMP
Filed March 18, 1938 2 Sheets-Sheet 2

INVENTOR.
JAMES P. JOHNSON
BY
ATTORNEY.

Patented June 4, 1940

2,202,913

UNITED STATES PATENT OFFICE 2,202,913

GEAR PUMP

James P. Johnson, Shaker Heights, Ohio, assignor, by mesne assignments, to Pump Engineering Service Corporation, Cleveland, Ohio, a corporation of Ohio Application March 18, 1938, Serial No. 196,692

2 Claims. (Cl. 103—126)

This invention relates to hydraulic pumps and more particularly to the gear type, embodying certain improvements which make it particularly adaptable for use on aircraft.

For low pressures, not exceeding 200 pounds per square inch, the rotary type pump is desirable and examples of its use are with Gyropilot installations and for pressure heating systems.

For higher pressures, however, ranging from 200 to 1500 pounds per square inch, the gear type pump is much more efficient, especially where the operating speed runs from 1000 to 4000 R. P. M. Pumps of this type are used in the operation of landing gear, flaps, brakes, wing tip floats, turrets, etc., and most effectively because of their wide range of pressures regardless of engine speeds.

It is, therefore, an object of the present invention to provide a high pressure gear pump capable of high lift, smoothness of operation, lack of pulsation and ability to develop and operate under whatever pressure is desired regardless of pump speed.

Another object of the invention is to provide a heavy cast insert of bearing material about which a housing of light material is cast thereby minimizing weight but with increased efficiency. Such a cast insert has three distinct advantages, namely, that it provides an enclosing housing for the pump gears of bearing material; next, that the expansion and contraction of the material forming the pump housing will have little or no effect upon the running fit of the gears, the bearing material being stiff enough to withstand the usual amount of contraction due to atmospheric changes; and, finally, that it permits the use of extremely high pressures without the danger of leakage such as may occur in material of the pump housing.

Another object of the present invention is to provide a means for effectively sealing the rotatable drive shaft against the escape of fluid under high pressure from within the pump housing the seal being maintained by the fluid pressure.

Another object of the present invention is to provide means for bleeding the fluid from adjacent the seal so as to reduce the pressure on the sealing means to an effective pressure but without damage to the operating parts.

Another object of the present invention is to provide means for effecting a predetermined pressure upon the sealing means independently of the fluid pressure within the pump housing.

With the objects above indicated and other objects hereinafter explained in view, my invention consists in the construction and combination of elements hereinafter described and claimed.

Referring to the drawings.

Figure 1:
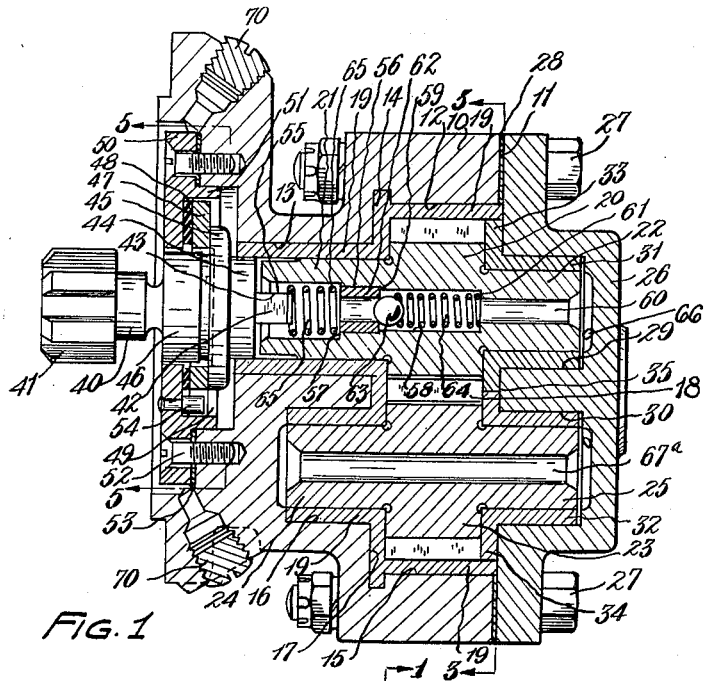
Figure 1 is a longitudinal sectional view taken on line 1—1 in Figure 2 and showing a gear pump embodying the present invention.
Figure 2:
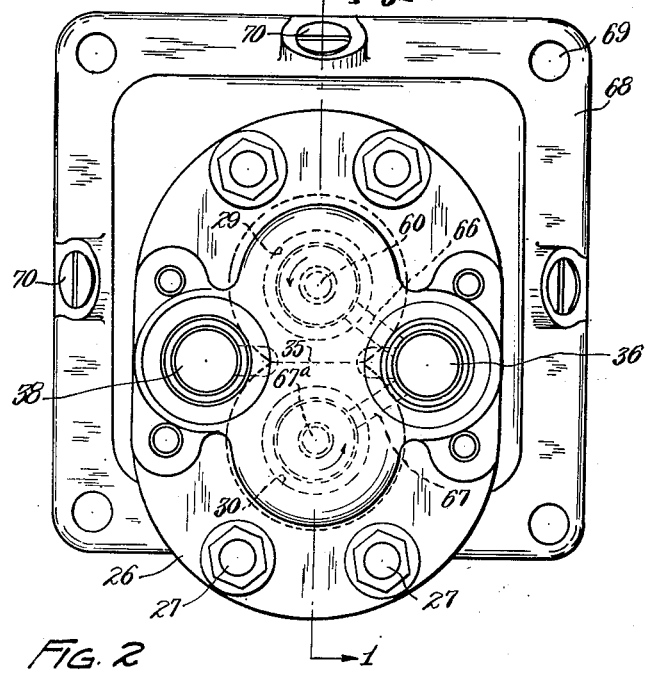
Figure 2 is a rear elevational view of the pump illustrated in Figure 1 and showing the position of the cover when the drive shaft is rotating in a clockwise direction as viewed from the drive shaft end.

In the drawings, I have illustrated one type of gear pump embodying the present invention but its specific application is not to be limited thereto, inasmuch as the invention has other adaptions well recognized by those skilled in the particular art.

Referring now to the illustrations, the pump comprises a housing 10, preferably an aluminum casting for lightness, although other suitable material may be used which has the desired characteristics. One end of the housing 10 is provided with a flat smooth surface 11 from which an axial opening 12 extends inwardly therefrom and communicates with an axial opening 13 of smaller diameter, extending inwardly from the opposite end of the housing 10 providing a transverse wall 14. Positioned below the opening 12 is a second opening 15 preferably of the same diameter as the opening 12, which likewise, extends inwardly from the flat surface 11 and communicates with a bore 16 of smaller diameter, but preferably of the same diameter as the opening 13, providing a transverse wall 17 which forms a continuation of the wall 14. The axes of the openings 12 and 13 are coaxial as are the axes of the opening 15 and bore 16, and while spaced apart the respective axes are in parallelism. Furthermore, the openings 12 and 15 slightly overlap at their adjacent portions providing an opening 18 thus affording communication between the openings.

The openings 12, 13, 15, and 16 are all heavily lined with a suitable bearing material 19 such as bronze and may be provided in any desirable manner. However, it is preferable to first cast the bronze insert to the shape desired and then to cast the aluminum material around the insert. By the so-called ram-up casting, it is possible to obtain a rigid union between the insert and cast aluminum and one in which the insert is of such thickness as to be substantially unaffected by contraction of the aluminum covering due to atmospheric conditions in actual use.

Figure 3:
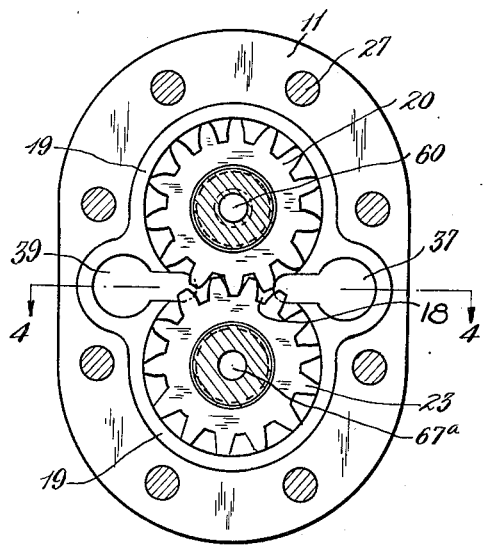
Figure 3 is a transverse sectional view taken substantially on line 3—3 in Figure 1 showing the position of the gears and the inlet and outlet openings in the pump housing.
Figure 4:
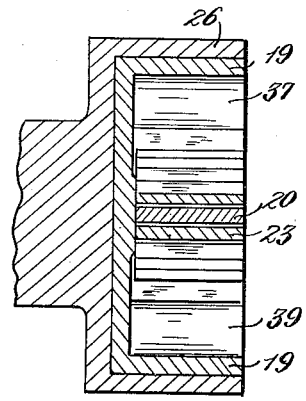
Figure 4 is a transverse sectional view taken on line 4—4 in Figure 3, showing the depth of the gear chamber and the bushing insert.
Figure 5:
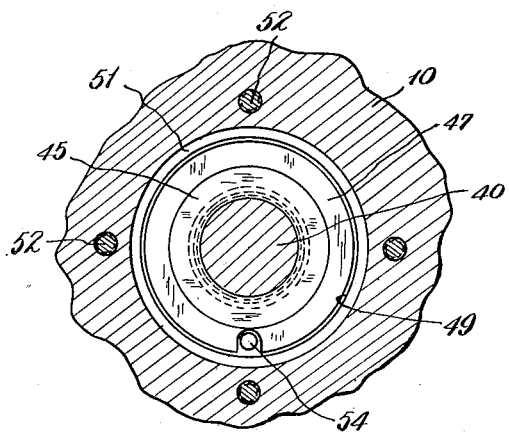
Figure 5 is a transverse sectional view taken on line 5—5 in Figure 1 showing the sealing means.

An external gear 20 is positioned within the opening 12 and has its teeth adapted for running engagement with the inner peripheral surface of the bearing material. The gear 20 is provided with axial extensions 21 and 22 which project outwardly on opposite sides and the extension 21 is rotatably mounted in the bearing material adjacent the opening 13. A second external gear 23 is positioned within the opening 15 and has its teeth adapted for running engagement with the inner peripheral surface of the adjacent bearing material. The gear 23 is provided with axial extensions 24 and 25 which project outwardly on opposite sides and the extension 24 is rotatably mounted in the bearing material adjacent the opening 16. The teeth of both gears 20 and 23 are in running mesh adjacent the opening 18 as more clearly shown in Figure 3.

A cover member 26 is positioned upon the flat surface 11 of the housing 10 and detachably connected to the latter by a plurality of bolts 27 and a gasket 28 is disposed between the cover and housing to provide a fluid tight joint. The cover member 26 has axial bores 29 and 30 extending outwardly which are in coaxial alignment with the openings 13 and 16 in the housing. These bores also have inserts or liners of bushing material and in the present instance comprise tubular extensions 31 and 32 disposed within the respective bores and circumferential integral flanges 33 and 34 at their inner ends, the adjacent peripheral portions of the flanges being flattened at 35 to prevent relative rotation. The extensions 22 and 25 of the gears 20 and 23 are also rotatably mounted in the bushing extensions 31 and 32 respectively and the peripheral edge of the flanges 33 and 34 fit closely within the outer end of the openings defined by the bearing material 19 within openings 12 and 15, to permit the inner faces to engage the adjacent ends of the gears and to hold the opposite ends of the gears in engagement with the bearing material on the transverse wall 14—17. With this arrangement the gears and their extensions are substantially entirely surrounded by the bearing material and it being of substantial thickness is unaffected by contraction occurring in the aluminum covering due to changes in atmosphere conditions, thereby providing a free running gear mounting.

The cover member 26 is further provided with an inlet opening 36, positioned upon one side thereof approximately midway of the bores 29 and 30 and extends inwardly from the outer end. This inlet opening communicates with a key-hole slot 37 extending inwardly from the flat surface 11 to the bushing material of the transverse wall 14—17 and the slot is positioned transversely with its smaller end in communication with the opening 18. The cover member 26 is further provided with an outlet opening 38 positioned upon the opposite side from the inlet opening 36 and extends inwardly from the outer end. This outlet opening communicates with a key-hole slot 39 extending inwardly from the flat surface 11 to the bushing material of the transverse wall 14—17, and the slot is positioned in reverse relation with respect to the slot 37 and has its smaller end in communication with the opening 18. This completes the passageway for the flow of fluid which is drawn in through the inlet opening 36, due to the suction created by the rotating gears, through the slot 37, around the drive gear 20 and around the driven gear 23, where it is discharged under pressure into the slot 39 and thence through the outlet opening 38 where it is conveyed through suitable conduit to the instrumentalities which it is to actuate.

The gear 20 may be driven by any suitable means but preferably a drive shaft 40 of steel, is provided which has a splined outer end 41 adapted for connection with the aircraft engine for positive rotation therefrom. The shaft extends through the end of the housing and has a transverse projection 42 upon its inner end which slidably fits within transversely aligned recesses 44 provided in the adjacent end of the extension 21. Outwardly of the projection 42 the shaft 40 is provided with an enlarged circular portion 43 which is disposed within and has a close running fit with the inner peripheral surface of the bearing material adjacent the opening 13. The inner face of the enlarged circular portion 43 is spaced slightly from the outer end of the extension 21 and is thereby limited in its movement axially in that direction.

Outwardly of the portion 43 the shaft 40 is provided with a circumferential flange 45 of larger diameter than that of the portion 43 and the outer face of the flange is machined smooth and true. About midway of its ends the shaft 40 is provided with an enlarged circular portion 46 of smaller diameter than that of the flange 45 and positioned outwardly of the latter. An inherently rigid disc 47 of bronze or other bearing material, is disposed outwardly of the flange 45 and has a central opening through which the enlarged portion 46 of the drive shaft freely extends. A flexible disc 48 of duprene and fabric or other similar material, is disposed outwardly of the disc 47 and housed within a circular recess 49 provided upon the inner side of an end plate 50. The end plate 50 has an inwardly extending circular flange 51 adapted to fit closely within a recessed opening in the adjacent end of the housing and is detachably connected to the latter by a plurality of screws 52. A gasket 53 is disposed at the outer marginal portion between the end plate 50 and the adjacent portion of the housing to provide a fluid tight joint. The discs 47 and 48 are secured to the end plate 50 in any suitable manner to prevent rotation and in the present instance have aligned openings to receive the free end of a pin 54 which has its opposite end rigidly connected to the end plate as more clearly shown in Figure 1. As many of these pins may be employed as desired, so as to maintain the discs in proper relation. The machined surface of the flange 45 has a running engagement with the adjacent surface of the disc 47 and the flange is forced into sealing engagement with the disc 47 by the pressure created within the pump housing during operation. The flexible disc 48 is provided to compensate for any misalignment of the drive shaft 40 without affecting the efficiency of the seal contact between the flange 45 and disc 47.

It will be appreciated that in view of the fact that the pressure within the pump increases tremendously and in direct proportion to the speed of the gears, it would be unsafe and injurious to the elements forming the seal if they were subjected to such high pressures for any length of time. Furthermore, the effectiveness of the seal can be maintained with relatively less pressure and to accomplish this result means is provided for bleeding the oil from adjacent the seal and returning it to the inlet side of the pump. In the present instance the drive gear 20 is provided with an axial opening extending entirely through it and its extensions. This opening is of large diameter at 55 and communicates with a portion 56 of smaller diameter at its inner end forming a shoulder 57. The opening has a portion 58 of smaller diameter than the portion 56 thus providing a shoulder 59. The opening has a further portion 60 of smaller diameter than the adjacent portion 58 thereby providing a shoulder 61 at its inner end, the outer end communicating with the adjacent end of the bore 29 in the cover 26. A tubular member 62 is secured within the portion 56 of the opening and seats against the shoulder 59, its inner end providing a valve seat. A ball valve member 63 is movably mounted in the portion 60 of the opening and engageable with the valve seat. A coiled spring 64 has one end engageable with the ball valve member 63 and its other end engageable with the shoulder 61 to normally maintain the valve member in engagement with its valve seat. A second coiled spring 65 is disposed within the portion 55 of the opening and has one end in engagement with the transverse projection 42 on the inner end of the drive shaft while its opposite end is in engagement with the shoulder 56 and the adjacent end of the tubular member 59 for normally urging the flange 45 into sealing engagement with the disc 47.

The tension of the coiled springs is predetermined so that the pressure exerted by the spring 65 and the pressure of the oil retained adjacent the seal is the effective sealing pressure, the excess oil passing through the opening 55, the opening in the tubular member 59 thereby unseating the valve member 63 and permitting flow through the portions 58 and 60 of the opening where it discharges into the bore 29 of the cover. The cover 26 is provided with a passageway 66 communicating with the bore 29 and the inlet opening 36 so that the oil discharged into the bore 29 is returned to the inlet opening. The gear 23 and its extensions may also be provided with an axial opening 67a extending entirely therethrough and having its outer end connecting with the bore 30 of the cover 26 whereby any oil may be discharged therefrom into the bore 30 and ultimately to the inlet opening 36 by means of a similar passageway 67. The gear pump is adapted for operation in either direction without the necessity of changing any of the operative parts of the pump and to so adapt the pump for operation in a reverse direction of that shown in the drawings, the cover member is removed, revolved 180 degrees, and again connected to the housing. This adjustment of the cover is required so that the excess fluid discharged from adjacent the seal will be discharged into the proper opening at all times constituting the inlet opening of the pump.

The housing has a squared flange 68 formed integral with the end adjacent the drive shaft and is provided with openings 69 by means of which the housing is suitably attached to the engine housing. A plurality of drain plug connections 70 are provided for draining any oil which might enter from the engine.

It is believed that a detailed description of the operation of the pump will not be necessary in view of the foregoing description.

While I have described the preferred embodiment of the invention it is to be understood that I am not to be limited thereto inasmuch as changes and modifications may be resorted to without departing from the spirit of the invention as defined in the appended claims.

What is claimed is:

1. In a gear pump, a housing of light weight material having an insert of bearing material of a lesser coefficient of expansion integrally embedded therein, said insert having a pair or circular openings extending inwardly from one end of said housing and communicating respectively with bores in said insert of relatively smaller diameters, a transversely disposed wall connecting said circular openings and said bores, the circular openings being disposed relatively in intersecting relation at their adjacent portions to provide communication therebetween, a pair of external pump gears rotatably disposed in said pair of circular openings and in abutting engagement with said transverse wall, said pump gears being in meshing engagement at the intersecting portions of said circular openings, said pump gears each having extensions of reduced diameter projecting axially outwardly on opposite sides thereof, the extensions on one side being rotatably disposed in said bores of relatively smaller diameters while the extensions on the opposite side project beyond the end of said housing, a cover member of light weight material detachably connected to the outer end of said housing and having a pair of bores extending outwardly from its inner face, inserts of bearing material of a lesser coefficient of expansion secured in the respective cover bores and having circular openings in which the outwardly projecting extensions are rotatably disposed, the inserts being provided with laterally extending circumferential flanges closely fitting within the adjacent ends of said circular openings in said housing insert in abutment with the adjacent faces of said gears, the adjacent portions of said flanges being flattened for cooperative engagement to prevent relative rotation therebetween, fluid openings and passageways in said housing communicating with the opposite sides of said pumping gears for the admission and discharge of fluid, the gear extension rotatably disposed in one of said bores of relatively smaller diameter in said housing insert being adapted for driving connection with a power source.

2. In a gear pump, a housing of light weight material having an insert of bearing material of a lesser coefficient of expansion integrally embedded therein, said insert having a pair of circular openings extending inwardly from one end of said housing and communicating respectively with bores in said insert of relatively smaller diameters, a transversely disposed wall connecting said circular openings and said bores, the circular openings being disposed relatively in intersecting relation at their adjacent portions to provide communication therebetween, a pair of external pump gears rotatably disposed in said pair of circular openings and in abutting engagement with said transverse wall, said pump gears being in meshing engagement at the intersecting portions of said circular openings, said pump gears each having extensions of reduced diameter projecting axially outwardly on opposite sides thereof, the extensions on one side being rotatably disposed in said bores of relatively smaller diameters while the extensions on the opposite side project beyond the end of said housing, a cover member of light weight material detachably connected to the outer end of said housing and having a pair of bores extending outwardly from its inner face, inserts of bearing material of a lesser coefficient of expansion secured in the respective cover bores and having circular openings in which the outwardly projecting extensions are rotatably disposed, the inserts being provided with laterally extending circumferential flanges closely fitting within the adjacent ends of the circular openings in abutment with the adjacent faces of said gears, fluid openings and passageways in said housing communicating with the opposite sides of said pumping gears for the admission and discharge of fluid, the gear extension rotatably disposed in one of said bores of relatively smaller diameter in said housing insert being adapted for driving connection with a power source.

JAMES P. JOHNSON.